United States Patent
LeCun et al.

(10) Patent No.: US 10,728,242 B2
(45) Date of Patent: *Jul. 28, 2020

(54) SYSTEM AND METHOD FOR BIOMETRIC AUTHENTICATION IN CONNECTION WITH CAMERA-EQUIPPED DEVICES

(71) Applicant: Element Inc., New York, NY (US)

(72) Inventors: Yann LeCun, New York, NY (US); Adam Perold, New York, NY (US); Yang Wang, Princeton, NJ (US); Sagar Waghmare, New York, NY (US)

(73) Assignee: Element Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,412

(22) Filed: Oct. 5, 2018

(65) Prior Publication Data

US 2019/0124079 A1 Apr. 25, 2019

Related U.S. Application Data

(63) Continuation of application No. 14/449,730, filed on Aug. 1, 2014, now Pat. No. 10,135,815, which is a (Continued)

(51) Int. Cl.
*H04L 29/06* (2006.01)
*G06F 21/32* (2013.01)
(Continued)

(52) U.S. Cl.
CPC .......... *H04L 63/0861* (2013.01); *G06F 21/32* (2013.01); *G06K 9/00033* (2013.01);
(Continued)

(58) Field of Classification Search
CPC ............. H04L 63/1416; H04L 63/1408; H04L 63/145; H04L 63/0861; H04L 9/3281; H04L 32/31; G07C 9/00087; G06F 21/32
See application file for complete search history.

(56) References Cited

U.S. PATENT DOCUMENTS 3,733,861 A 5/1973 Lester
4,371,951 A * 2/1983 Kort .................. H03M 7/30
712/2
(Continued)

FOREIGN PATENT DOCUMENTS

CN 102426715 A 4/2012
EP 0049039 A1 4/1982
(Continued)

OTHER PUBLICATIONS

"Media filter." From Wikipedia, the free encyclopedia. Downloaded from the internet https://en.wikipedia.org/w/index.php?title=Median_filter&olded=489380290. Downloaded on Mar. 10, 2016, 4 pages.

(Continued)

*Primary Examiner* — Ali S Abyaneh
(74) *Attorney, Agent, or Firm* — Wilson Sonsini Goodrich & Rosati

(57) ABSTRACT

The present invention relates generally to the use of biometric technology for authentication and identification, and more particularly to non-contact based solutions for authenticating and identifying users, via computers, such as mobile devices, to selectively permit or deny access to various resources. In the present invention authentication and/or identification is performed using an image or a set of images of an individual's palm through a process involving the following key steps: (1) detecting the palm area using local classifiers; (2) extracting features from the region(s) of interest; and (3) computing the matching score against user models stored in a database, which can be augmented dynamically through a learning process.

21 Claims, 5 Drawing Sheets

Related U.S. Application Data continuation of application No. 14/019,512, filed on Sep. 5, 2013, now abandoned.

(60) Provisional application No. 61/696,820, filed on Sep. 5, 2012.

(51) Int. Cl.
| | | |
|---|---|---|
| *G06K 9/00* | (2006.01) | |
| *H04L 9/32* | (2006.01) | |
| *G06K 9/46* | (2006.01) | |
| *G06K 9/62* | (2006.01) | |

(52) U.S. Cl.
CPC ......... *G06K 9/4676* (2013.01); *G06K 9/6223* (2013.01); *G06K 9/6271* (2013.01); *H04L 9/3231* (2013.01); *H04L 63/10* (2013.01)

(56) References Cited

U.S. PATENT DOCUMENTS

| | | | |
|---|---|---|---|
| 5,067,164 A | 9/1991 | Denker et al. | |
| 5,058,179 A | 10/1991 | Denker et al. | |
| 5,450,523 A * | 9/1995 | Zhao | 704/243 |
| 5,774,059 A | 6/1998 | Henry et al. | |
| 5,867,802 A | 2/1999 | Borza | |
| 6,274,745 B1 | 8/2001 | Inanaga et al. | |
| 6,628,813 B2 | 9/2003 | Scott et al. | |
| 6,633,090 B2 | 10/2003 | Harter et al. | |
| 6,923,370 B2 | 8/2005 | Gotfried et al. | |
| 6,956,608 B1 | 10/2005 | Shapiro et al. | |
| 6,992,562 B2 | 1/2006 | Fuks et al. | |
| 7,218,761 B2 * | 5/2007 | McClurg | G06K 9/00013 353/81 |
| 7,660,442 B2 * | 2/2010 | Sweeney | G06K 9/00033 382/115 |
| 8,026,840 B2 | 9/2011 | Dwelly et al. | |
| 8,064,645 B1 | 11/2011 | Sezille | |
| 8,160,307 B2 * | 4/2012 | Polcha | G06K 9/00013 340/5.52 |
| 8,194,938 B2 * | 6/2012 | Wechsler | G06K 9/00288 382/118 |
| 8,638,939 B1 | 1/2014 | Casey et al. | |
| 8,965,287 B2 | 2/2015 | Lam | |
| 9,002,586 B2 | 4/2015 | Feit | |
| 9,003,196 B2 | 4/2015 | Hoyos et al. | |
| 9,081,947 B2 | 7/2015 | Dewan et al. | |
| 9,111,402 B1 | 8/2015 | Krishnan et al. | |
| 9,641,523 B2 | 5/2017 | Langley et al. | |
| 9,652,663 B2 | 5/2017 | Lau et al. | |
| 9,913,135 B2 | 3/2018 | Perold et al. | |
| 2004/0017934 A1 | 1/2004 | Kocher | |
| 2005/0117784 A1 | 6/2005 | Merbach et al. | |
| 2006/0120568 A1 | 6/2006 | McConville et al. | |
| 2006/0294393 A1 | 12/2006 | Mc Call | |
| 2008/0002860 A1 * | 1/2008 | Super | G06K 9/00375 382/114 |
| 2008/0056539 A1 | 3/2008 | Sweeney et al. | |
| 2008/0091952 A1 | 4/2008 | Sumner et al. | |
| 2008/0263681 A1 | 10/2008 | Dooms et al. | |
| 2008/0284726 A1 * | 11/2008 | Boillot | G06F 3/0304 345/156 |
| 2008/0296364 A1 | 12/2008 | Pappas et al. | |
| 2009/0001160 A1 | 1/2009 | Davis et al. | |
| 2009/0175506 A1 | 7/2009 | Polcha et al. | |
| 2009/0185726 A1 | 7/2009 | Higuchi | |
| 2009/0249478 A1 | 10/2009 | Rosener et al. | |
| 2009/0297032 A1 * | 12/2009 | Loui | G06K 9/00664 382/195 |
| 2010/0030698 A1 | 2/2010 | Goodin | |
| 2010/0042940 A1 | 2/2010 | Monday et al. | |
| 2010/0046830 A1 | 2/2010 | Wang et al. | |
| 2010/0127827 A1 * | 5/2010 | Watanabe | G06K 9/00342 340/5.83 |
| 2010/0128936 A1 | 5/2010 | Baughman | |
| 2010/0148923 A1 | 6/2010 | Takizawa | |
| 2010/0191551 A1 | 7/2010 | Drance et al. | |
| 2010/0246902 A1 | 9/2010 | Rowe et al. | |
| 2011/0119734 A1 | 5/2011 | Crawford et al. | |
| 2011/0135166 A1 | 6/2011 | Wechsler et al. | |
| 2011/0229045 A1 * | 9/2011 | Yu | G06K 9/00664 382/224 |
| 2011/0254942 A1 | 10/2011 | Suzuki | |
| 2011/0270712 A1 | 11/2011 | Wood et al. | |
| 2011/0317872 A1 | 12/2011 | Free | |
| 2012/0046862 A1 | 2/2012 | Griffin et al. | |
| 2012/0128936 A1 | 5/2012 | Imajima et al. | |
| 2012/0137137 A1 | 5/2012 | Brickell et al. | |
| 2012/0162385 A1 * | 6/2012 | Park | H04N 13/254 348/47 |
| 2012/0218936 A1 | 8/2012 | Fleeman et al. | |
| 2013/0099892 A1 | 4/2013 | Tucker et al. | |
| 2013/0222835 A1 * | 8/2013 | Iwamoto | G06F 21/608 358/1.14 |
| 2013/0227651 A1 | 8/2013 | Schultz et al. | |
| 2013/0268418 A1 | 10/2013 | Sardi et al. | |
| 2013/0286161 A1 | 10/2013 | Lv et al. | |
| 2013/0290154 A1 | 10/2013 | Cherry et al. | |
| 2013/0294642 A1 * | 11/2013 | Wang | G06K 9/00261 382/103 |
| 2013/0311866 A1 | 11/2013 | Herold | |
| 2014/0013252 A1 | 1/2014 | Ehrler et al. | |
| 2014/0037134 A1 * | 2/2014 | Tong | G06K 9/00355 382/103 |
| 2014/0068740 A1 | 3/2014 | Lecun et al. | |
| 2014/0072185 A1 | 3/2014 | Dunlap et al. | |
| 2014/0195974 A1 | 7/2014 | Ballard et al. | |
| 2014/0366113 A1 | 12/2014 | Lecun et al. | |
| 2015/0010145 A1 | 1/2015 | Iwashita et al. | |
| 2015/0039892 A1 | 2/2015 | Fujita et al. | |
| 2015/0055841 A1 | 2/2015 | Xiao et al. | |
| 2015/0256740 A1 | 9/2015 | Kalama | |
| 2015/0310259 A1 | 10/2015 | Lau et al. | |
| 2015/0334562 A1 | 11/2015 | Perold et al. | |
| 2015/0347833 A1 | 12/2015 | Robinson et al. | |
| 2015/0348112 A1 | 12/2015 | Jain | |
| 2015/0350225 A1 | 12/2015 | Perold et al. | |
| 2016/0283710 A1 | 9/2016 | Kwon et al. | |
| 2016/0371555 A1 | 12/2016 | Derakhshani et al. | |
| 2017/0064062 A1 | 3/2017 | Lee et al. | |
| 2017/0124385 A1 | 5/2017 | Ganong et al. | |
| 2017/0186170 A1 | 6/2017 | Nugraha et al. | |
| 2018/0181737 A1 | 6/2018 | Tussy | |
| 2018/0189960 A1 | 7/2018 | Martin | |
| 2018/0253152 A1 | 9/2018 | Forsblom et al. | |

FOREIGN PATENT DOCUMENTS

| | | |
|---|---|---|
| EP | 0049039 B1 | 7/1984 |
| EP | 2192526 A2 | 6/2010 |
| JP | H10177650 A | 6/1998 |
| JP | 2002032343 A | 1/2002 |
| JP | 2002207705 A | 7/2002 |
| JP | 2002259345 A | 9/2002 |
| JP | 2003148017 A | 5/2003 |
| JP | 2006259923 A | 9/2006 |
| JP | 2008242631 A | 10/2008 |
| JP | 2009017516 A | 1/2009 |
| JP | 2010128822 A | 6/2010 |
| JP | 2010146502 A | 7/2010 |
| JP | 2010177650 A | 8/2010 |
| WO | WO-2007000504 A1 | 1/2007 |
| WO | WO-2009013526 A1 | 1/2009 |
| WO | WO-2012020591 A1 | 2/2012 |
| WO | WO-2014039732 A2 | 3/2014 |
| WO | WO-2015175670 A1 | 11/2015 |
| WO | WO-2015187882 A1 | 12/2015 |

OTHER PUBLICATIONS

"PCT/US2015/030586 International Search Report and Written Opinion dated Aug. 20, 2015".

(56) References Cited

OTHER PUBLICATIONS

"PCT/US2015/034077 International Search Report and Written Opinion dated Sep. 30, 2015".
Boult et al. Revocable fingerprint biotokens: Accuracy and security analysis. 2007 IEEE Conference on Computer Vision and Pattern Recognition, 2007, 8 pages.
Boureau, et al., A theoretical analysis of feature pooling in visual recognition. Proceedings of the 27th International Conference on Machine Learning. 2010; 111-118.
Cortes et al., Support-vector networks. Machine Learning. 1995; 20:273-297.
Dalal et al., Histograms of oriented gradients for human detection. Proceedings of the 2005 IEEE Computer Society Conference on Computer Vision and Pattern Recognition. 2005; 1:886-893.
Han et al., Palmprint recognition based on directional features and graph matching. Advances in Biometrics: ICB 2007, 4642:1164-1173, 2007.
Lecun et al., Convolutional networks and applications in vision. Proceedings of IEEE International Symposium on Circuits and Systems. 2010; 253-256.
Lecun et al., Gradient-based learning applied to document recognition. Proceedings of the IEEE. Nov. 1998; 86(11):2278-2324.
Lowe, D. Distinctive image features from scale-invariant keypoints. International Journal of Computer Vision. 2004; 60(2):91-110.
PCT/US2013/058343 International Preliminary Report on Patentability dated Mar. 19, 2015.
PCT/US2013/058343 International search report dated Mar. 13, 2014.
PCT/US2015/030586 International Preliminary Report on Patentability dated Nov. 24, 2016.
PCT/US2015/034077 International Preliminary Report on Patentability dated Dec. 15, 2016.
PCT/US2018/051559 International Search Report and Written Opinion dated Nov. 30, 2018.
Sermanet et al., Pedestrian detection with unsupervised multi-stage feature learning. Proceedings of the IEEE Conference on Computer Vision and Pattern Recognition. Jun. 2013; 3626-3633.
U.S. Appl. No. 14/449,730 Office Action dated Mar. 31, 2016.
U.S. Appl. No. 14/449,730 Office Action dated May 30, 2017.
U.S. Appl. No. 14/449,730 Office Action dated Oct. 18, 2017.
U.S. Appl. No. 14/449,730 Office Action dated Sep. 14, 2016.
U.S. Appl. No. 14/711,664 Office Action dated Apr. 7, 2017.
U.S. Appl. No. 14/711,664 Office Action dated Sep. 30, 2016.
U.S. Appl. No. 14/730,166 Office Action dated Feb. 28, 2017.
U.S. Appl. No. 14/730,166 Office Action dated Jul. 13, 2017.
U.S. Appl. No. 14/730,166 Office Action dated Sep. 29, 2016.
U.S. Appl. No. 14/019,512 Office Action dated Nov. 6, 2014.
U.S. Appl. No. 14/449,730 Final Office Action dated Apr. 30, 2015.
U.S. Appl. No. 14/449,730 Office Action dated Nov. 18, 2014.
Viola et al., Rapid object detection using a boosted cascade of simple features. Proceedings of the 2001 IEEE Computer Society Conference on Computer Vision and Pattern Recognition. 2001; 1:I-511-I-518.
International Application No. PCT/US2018/051559 International Search Report and Written Opinion dated Nov. 30, 2018.
Rokita et al.: Cell Phones Personal Authentication Systems Using Multimodal Biometrics. ICIAR:25-27 (2008).
U.S. Appl. No. 16/134,781 Office Action dated Mar. 21, 2019.

* cited by examiner

SYSTEM AND METHOD FOR BIOMETRIC AUTHENTICATION IN CONNECTION WITH CAMERA-EQUIPPED DEVICES

CROSS-REFERENCE TO RELATED APPLICATIONS

This application is a continuation of U.S. patent application Ser. No. 14/449,730, filed Aug. 1, 2014, which is a continuation of U.S. patent application Ser. No. 14/019,512, filed Sep. 5, 2013, which claims the benefit of U.S. provisional patent application No. 61/696,820, filed 5 Sep. 2012, the entire disclosures of which applications are hereby incorporated herein by reference.

BACKGROUND OF THE INVENTION

Field of the Invention

The present invention relates generally to the use of biometric technology for authentication and identification, and more particularly to non-contact based solutions for authenticating and identifying users, via computers, such as mobile devices, to selectively permit or deny access to various resources. In the present invention authentication and/or identification is performed using an image or a set of images of an individual's palm through a process involving the following key steps: (1) detecting the palm area using local classifiers; (2) extracting features from the region(s) of interest; and (3) computing the matching score against user models stored in a database, which can be augmented dynamically through a learning process.

Discussion of Related Art

Mobile devices, such as smartphones, tablets, and notebooks, have become widely adopted and used by many people on a daily basis. These devices have become more and more powerful and as developers create more and more applications and services that run on them, they become even more entrenched in our daily lives. These mobile devices not only provide a powerful computing platform in their own right but they also provide connectivity to a practically unlimited set of services, applications and data available on remote platforms which are typically accessed via a wireless link to a cell site and then backhauled to the internet backbone. In addition to accessing these remote platforms, mobile devices also have the ability to connect to other mobile devices through short and long range wireless connections.

Perhaps most importantly, the ever increasing penetration of these devices combined with the ongoing reduction in costs associated with component parts in these devices, has resulted in the devices becoming available with greater capabilities while still remaining affordable for many users. For example, as a result of the reduction in costs of component parts and the development of more powerful software, a substantial number of smartphones now include powerful cameras, which can take extraordinarily detailed photos on the order of eight megapixels or more.

One important issue that arises in the context of mobile devices and their widespread use in connection with so much functionality and their need to interact with so many different resources is the need to control access to each of these resources so that only those individuals or devices that should be authorized to access the applicable resources are actually able to do so. In the typical case, resource access is controlled through the input of text/numerical strings, such as user IDs and passwords. For example, a smartphone user may be required to enter a four digit code before he is permitted to access any functionality on the device. In addition, each local application or other resource on the device might require the user to enter one or more text/numerical strings prior to obtaining access to the resource. In this case, the correct data (user ID, password, etc.) may be stored in the memory of the device. Alternatively, for access to resources (applications, data, communication capabilities, etc.) that are located remotely from the device, the user and/or the device might be required to transmit a correct set of text/numerical strings to the remote resource which, in turn, verifies that the transmitted data matches the correct data before permitting access to the resource.

As one might imagine, for a typical smartphone user, for example, there are a number of drawbacks with the foregoing techniques for authentication and identification. For one, the need to remember user IDs and passwords for so many different applications, services, and other resources, each having their own requirements for how those IDs and passwords must be constructed, can be quite daunting and users often forget their IDs and passwords for resources that they do not access on a frequent basis. Another disadvantage is that there are security concerns with using textual/numeric strings to control access to resources. There are, for example, powerful software programs that can be used to hack these strings to gain unauthorized access to resources.

Also, the typical contact-based method of a user using his or her fingers to enter passwords and user IDs on the smartphone screen lends itself to security risks. Experienced hackers are often able to "lift" the fingerprint pattern from the screen based on the oil residue left by the finger to gain unauthorized access. This is particularly true in the context of entering a short numerical string such as a four digit number to unlock the device. Once the device is unlocked, many of the resources on the device might not even be secured leading to serious security risks.

One solution that has been targeted to eliminate or reduce the drawbacks discussed above involves the use of biometric technology to control access to resources available via mobile devices. While these solutions have, in some cases, eliminated some of the drawbacks discussed above, they still suffer from a number of disadvantages. For example, some contact-based solutions call for a user to place his or her finger on the device sensor, which has the ability to capture the user's fingerprint, which is then matched against local or remotely located fingerprint data to determine if there is a match sufficient to allow the user or the device to access one or more resources. In this case, as referenced above, a fingerprint can be lifted from the device sensor by a hacker and used to gain unauthorized access to one or more resources at a later time utilizing that appropriated fingerprint. These solutions also typically suffer from the drawback that the time to perform the processing necessary to determine if the fingerprint is a match can be unacceptable in the context of a busy user trying to gain access to many different resources on the device during the course of a typical day.

There are additional health issues associated with contact-based methods involving transmittal of germs, viruses, or other biological hazards, particularly in the case of shared devices between users. As is known in the art, an individual's fingertips, and an individual's hands more generally, are often one of the primary mediums for transferring germs, viruses, or other biological hazards between people. In the case of individual devices being shared amongst multiple people, contact-based methods of authentication and identification in which a user types an identifying string with his or her fingertips, or authenticates or identifies himself or herself through contact-based biometric methods, such as fingerprint or palm print recognition, among others, create risk of transferring said biological hazards via the shared contact medium.

SUMMARY OF THE INVENTION

It is thus an object of the invention to provide a non-contact based biometric system and methodology that supports accurate, secure, and rapid authentication and/or identification of users and devices to provide selective access to resources accessible through camera-equipped devices.

In one embodiment of the present invention, users of such camera-equipped devices (hereinafter referred to at times as "smartphones" for convenience, although the devices are to be understood as including all devices with a camera capability, including both mobile devices and stationary devices, such as desktop computers) who are required to identify or authenticate themselves as a condition of obtaining access to one or more resources take one or a series of photos of their palm or both palms using the smartphone camera. The system of the present invention then employs computer vision technology to analyze the palm print image and either verify that the palm print signature matches the user's model in a database (user authentication) or find the matching user model among many models in a database (user identification).

Further features and aspects of the present invention will become apparent from the following detailed description of exemplary embodiments in connection with reference to the attached figures.

DETAILED DESCRIPTION OF EXEMPLARY EMBODIMENTS

Reference will now be made in detail to various exemplary embodiments of the invention. It is to be understood that the following discussion of exemplary embodiments is not intended as a limitation on the invention, as broadly disclosed herein. Rather, the following discussion is provided to give the reader a more detailed understanding of certain aspects and features of the invention.

Before embodiments of the present invention are described in detail, it is to be understood that the terminology used herein is for the purpose of describing particular embodiments only, and is not intended to be limiting. Unless defined otherwise, all technical terms used herein have the same meaning as commonly understood by one of ordinary skill in the art to which the term belongs. Although any methods and materials similar or equivalent to those described herein can be used in the practice of the present invention, the preferred methods and materials are now described. All publications mentioned herein are incorporated herein by reference to disclose and describe the methods and/or materials in connection with which the publications are cited. The present disclosure is controlling to the extent it conflicts with any incorporated publication.

As used herein and in the appended claims, the singular forms "a", "an", and "the" include plural referents unless the context clearly dictates otherwise. Thus, for example, reference to "a palm" includes a single palm or both palms of an individual and reference to "an image" includes reference to one or more images. Furthermore, the use of terms that can be described using equivalent terms include the use of those equivalent terms. Thus, for example, the use of the term "camera" is to be understood to include any device capable of obtaining an image of an object. As another example, and as mentioned above, the term "smartphone" includes all devices with a camera capability.

Figure 1:
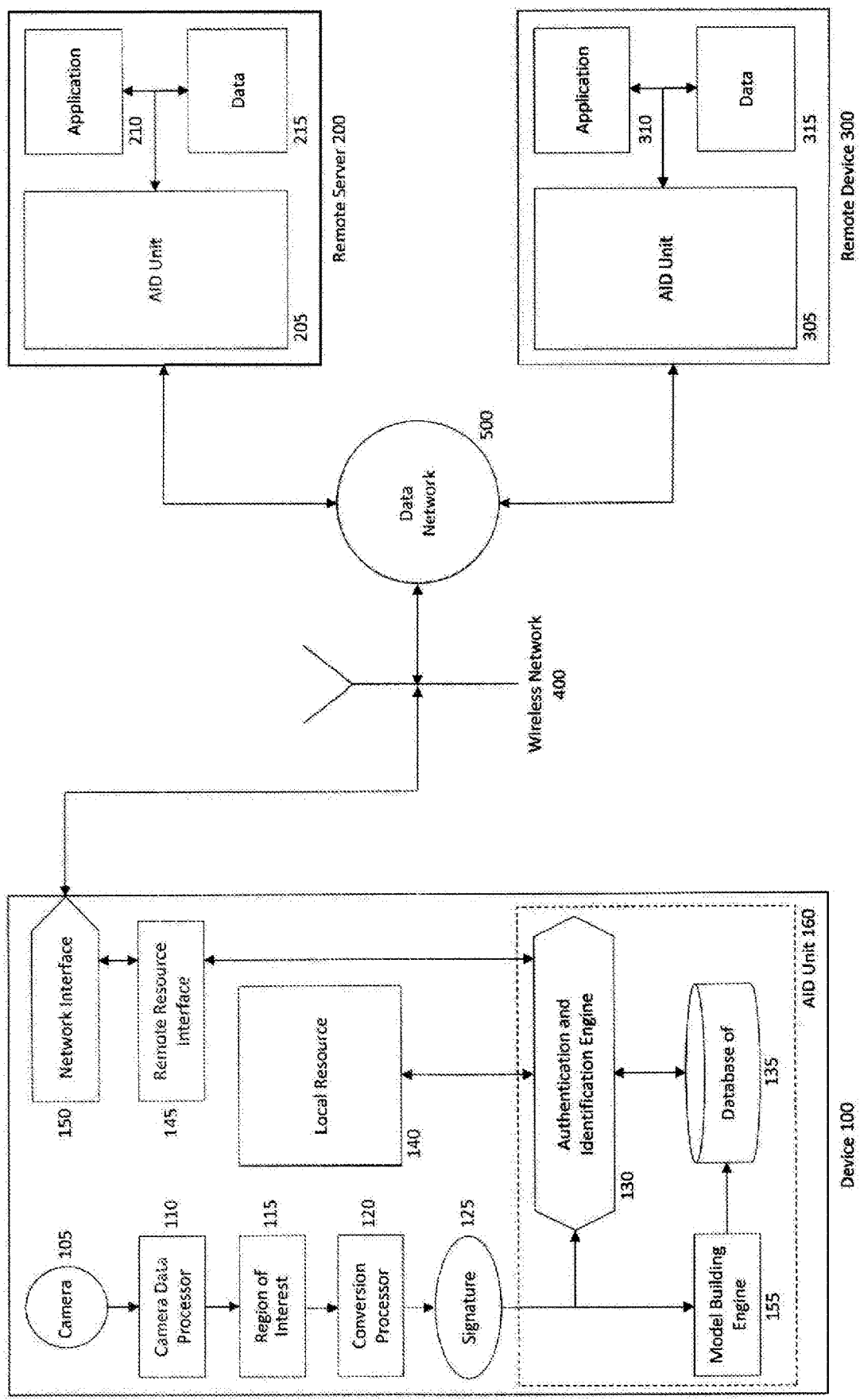
FIG. 1 is a diagram depicting the major components of the system of the present invention in a preferred embodiment thereof.

A description of the present invention in preferred embodiments thereof, now follows. With reference to FIG. 1, a discussion of the key components of the system of the present invention now follows as well as the context in which each of these components interact with one another to derive the advantages of the present invention. Device 100 can be any device that contains a camera capable of taking high quality photographs. Preferably, the camera of Device 100 also contains a flash element capable of being selectively and rapidly activated and deactivated for illuminating the area to be photographed. Examples of such Devices 100 include smartphones, tablet computers, notebooks, and any other device that can be carried by a user and that provides a computing platform that allows for the functionality of the present invention to be operative, as well as desktop computers or a variety of stationary embedded devices. Examples of such stationary embedded devices include camera equipment fixed to facility entryways or other strategic locations providing secure access to physical spaces or other resources, or camera equipment fixed to strategic locations for such purposes as time and attendance protocols, as well as other applications. Although not required, Device 100 can also contain various other features, such as a viewing screen (which may also be a touchscreen), a keypad, an accelerometer, GPS capabilities, storage capacity, and a central processing unit (CPU).

Device 100 includes at least one Camera 105, which is preferably capable of producing high quality photographs of, for example, two megapixels or more, such as four megapixels, six megapixels, or eight megapixels. Camera Data Processor 110 receives the image data from Camera 105 and processes it as known in the art to create pixel data representative of the photograph, which may be used in various ways, including for the purposes outlined in connection with the present invention as now described. The data from Camera Data Processor 110 is fed to Region of Interest Detector 115, which serves to locate the area of the palm within the broader image, and delineate the area with a high level of precision and consistency, such as to provide masks of the palm area of substantially the same shape and position on the palm through a variety of independent images with different lighting conditions and orientations of the palm to the camera.

In one embodiment of Region of Interest Detector 115, the region of interest is detected using sliding window-based local classifiers to label palm and non-palm pixels by the classification scores, followed by a segmentation step to group neighboring palm pixels into connected components in the input image. A high level of accuracy and robustness to image noise can be achieved because a significant number of discriminative local features are learned from a large collection of exemplar images to capture the stable characteristics of the palm appearance to form strong classifiers. As a result, the trained detector can precisely locate and delineate the region(s) of interest on input images taken free-form with various hand orientations and lighting conditions.

In one embodiment of Region of Interest Detector 115, local classifiers based on Haar Wavelets and AdaBoost (reference 1) are used to detect the region of interest in the palm area of a user's hand. In another embodiment of Region of Interest Detector 115, local classifiers based on support vector machines (reference 2) are used to detect the region of interest in the palm area of a user's hand. In another embodiment of Region of Interest Detector 115, a convolutional neural network is used to detect the region of interest in the palm area of a user's hand, such as the ones described in U.S. Pat. Nos. 5,067,164 and 5,058,179, and in (references 3 and 4).

Region of Interest Detector 115 then feeds the image data, including the palm area mask, to Conversion Processor 120, which serves to extract a Signature 125 from image patches representing the characteristic features of the individual's palm area that can be used to distinguish the individual from another user, wherein said patches are small sampling windows within the palm area mask.

In one embodiment, Signature 125 is a vector computed as follows. First, a histogram of edge orientations in a number of well-chosen regions in the image is computed. This may be performed using one of the well-known methods of computer vision for extracting local image descriptors, such as Scale Invariant Feature Transform (SIFT) (see, for example, reference 5), Histogram of Oriented Gradients (HOG) (see, for example, reference 6), and other references known in the art. Second, each orientation histogram is compared with a number of prototypes that have been computed from training data, for example using the well-known K-means clustering algorithm. Finally, the signature vector is formed such that component k of the vector corresponds to the k-th prototype aforementioned. Component k contains the number of regions for which the histogram was closer to prototype k than to all other prototypes. This sequence of operations is known in the literature as a "Bag of Features" representation (see reference 7, for example). It should be apparent from the current teachings that in another embodiment of the present invention, multiple Bags of Features can be used to preserve the geometric relationship between local regions.

Signature 125 is then fed to Authentication and Identification Engine (AID Engine) 130, which serves to implement many of the key processes of the present invention as hereinafter described. AID Engine 130 communicates with Database of User Models 135, if present, to store a local copy of a user model. Thus, in the case of applications or services that reside locally on Device 100 and do not require external communication with, for example, remote servers or remote devices, a user signature resulting from palm print images taken by Camera 105 may be compared against known user model(s), stored in Database of User Models 135 for authentication or identification. The user models are statistical models computed from a collection of an individual's palm images, with the signatures derived from those images defining the model. In one embodiment, the user model consists of a so-called Gaussian density model of the signatures computed from the user's reference images. Given the signature of query image S, the user model is used to compute a matching score. The signature is considered to be matched to the user model if the matching score $$R = \sum_i \frac{(Si - Mi)^2}{Vi + u}$$

where Mi and Vi are the mean and variance of the i-th component of the signature vectors of all the reference images of the given user, and u is a small constant. The signature is considered to be matched to the user model if the matching score R is larger than a pre-selected threshold for this user model. The Authentication and Identification Engine 130, Model Building Engine 155, and Database of User Models 135 form an AID Unit 160.

Signature 125 is also fed to Model Building Engine 155 to initialize the user model during the first time of user enrollment or selectively incorporate the information of the signature to refine the user model stored in Database of User Models 135 if the model is already present. In one embodiment of the present invention, Model Building Engine 155 updates the aforementioned means and variances Mi and Vi using the signature extracted from new images of the user.

Device 100 also preferably contains a Remote Resource Interface 145, which communicates with AID Engine 130. Remote Resource Interface 145 serves as the interface between the authentication and identification functionalities implemented on Device 100 and those same functionalities as they occur on external/remote resources, such as remote servers and remote devices. Thus, for example, Remote Resource Interface 145 interacts with applications resident on remote servers to coordinate authentication or identification as required by the remote applications. This can include managing and responding to requests by external resources for authentication or identification of a user operating Device 100 or for authentication or identification of Device 100 itself.

Remote Resource Interface 145 can communicate with Network Interface 150 to transmit and receive data in connection with authentication and identification activities. Various wireless communication protocols can be used, including radio frequency as well as others, including and without limitation, Bluetooth and other near field communications technologies. In a preferred embodiment of the present invention, the data communicated back and forth from Device 100 over the open wireless link is secured as is known in the art by means of, for example, encryption and/or other methodologies, which reduce or eliminate the possibility that user data and other data associated with the authentication and identification methodologies of the present invention can be intercepted by unauthorized parties. Network Interface 150 typically comprises a radio frequency transceiver module as is known in the art and permits Device 100 to communicate via wireless link with Wireless Network 400. Wireless Network 400, in turn, typically backhauls the data that is transmitted by or to be received by Device 100 to Data Network 500, again as is known in the art.

By way of example only, the present invention permits users of Device 100 or Device 100 itself to be authenticated or identified by remote servers and applications and other resources residing on remote servers. As illustrated in FIG. 1, Remote Server 200 can communicate with Device 100 via the communication path discussed above. In this manner and as controlled by Remote Resource Interface 145 residing on Device 100, AID Unit 205 residing on Remote Server 200 can request and receive authentication and identification data from Device 100 for comparison with known and validated user models residing on or accessible by Remote Server 200 as more fully described below. This authentication and identification capability provides for selective access to one or more Applications 210, Data 215, and other resources residing on Remote Server 200. The same capability may also provide for selective access to Local Resources 140, including applications, data, and/or other resources residing on Device 100, as well as cases where such local resources seek access to data or other resources that are remote to Device 100.

In another embodiment of the present invention, communication as discussed above can occur between Device 100 and one or more Remote Devices 300. Remote Devices 300 can be the same or different device types as Device 100 and authentication/identification functionality according to the teachings of the present invention can occur both ways. In other words, Device 100 can respond to authentication/identification requests from Remote Device 300 in order to access, for example, one or more Applications 310 and/or Data 315 residing on Remote Device 300 via the AID Unit 305 on Remote Device 300. But also, Remote Device 300 can receive and respond to authentication and identification requests initiated by Device 100 in order for Remote Device 300 (or a user operating it) to access resources resident on Device 100. In some cases both Device 100 and Remote Device 300 will require authentication and/or identification of the other before resources are shared. This might occur, for example, in the context of a desired secure communication between users of Device 100 and Remote Device 300.

Figure 2:
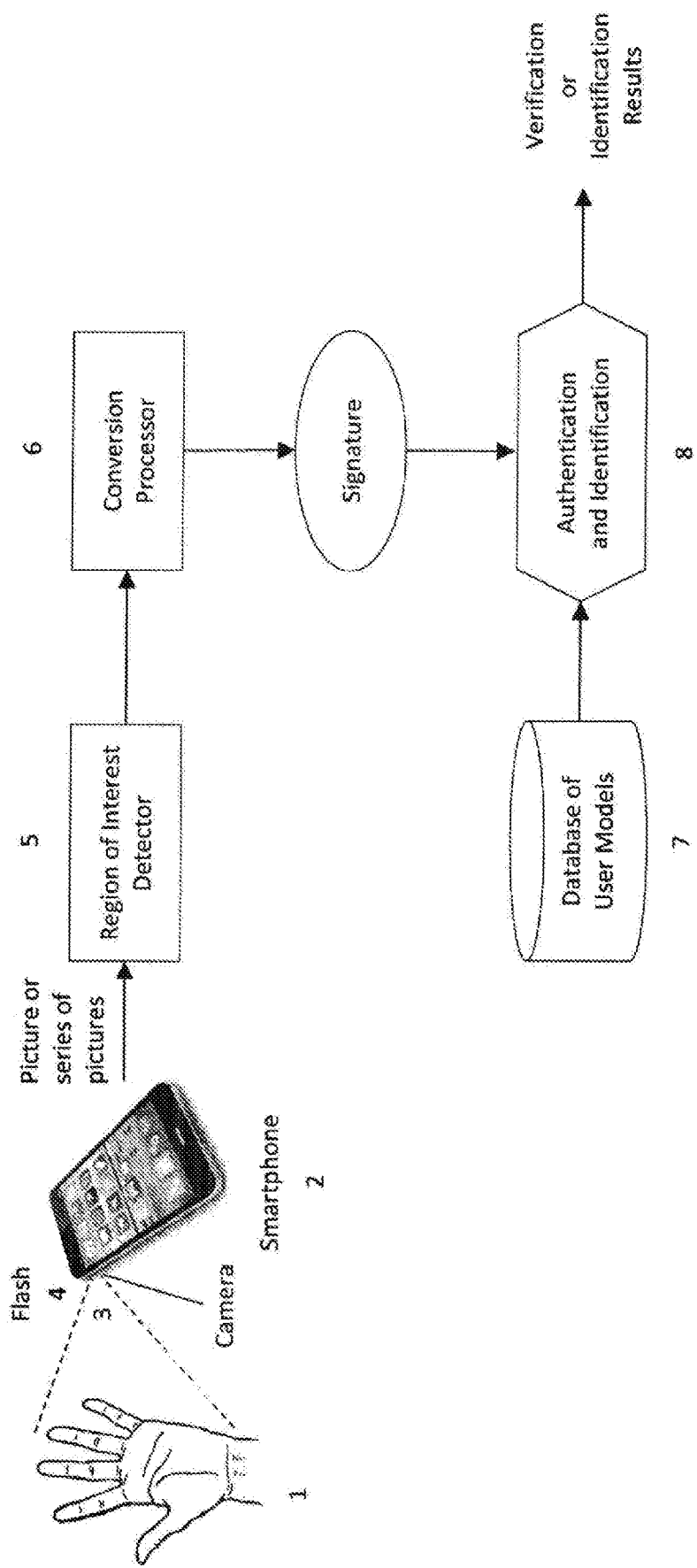
FIG. 2 is a block diagram, which is useful in illustrating the methodology of the present invention in a preferred embodiment thereof.

Turning now to FIG. 2, the methodology of user/device authentication and/or identification according to a preferred embodiment of the present invention is now described. By way of initial discussion, the difference between authentication and identification in the context of the teachings of the present invention is first described.

In the case of authentication, the user presents an identity in the form of a user ID or user name and the system of the present invention verifies that the user is indeed who he or she claims to be. The system then compares the signature derived from an image or images of the user's palm with the corresponding model in the database of user models. If they match, the user is authenticated. If they do not match, the user is rejected.

Figure 4:
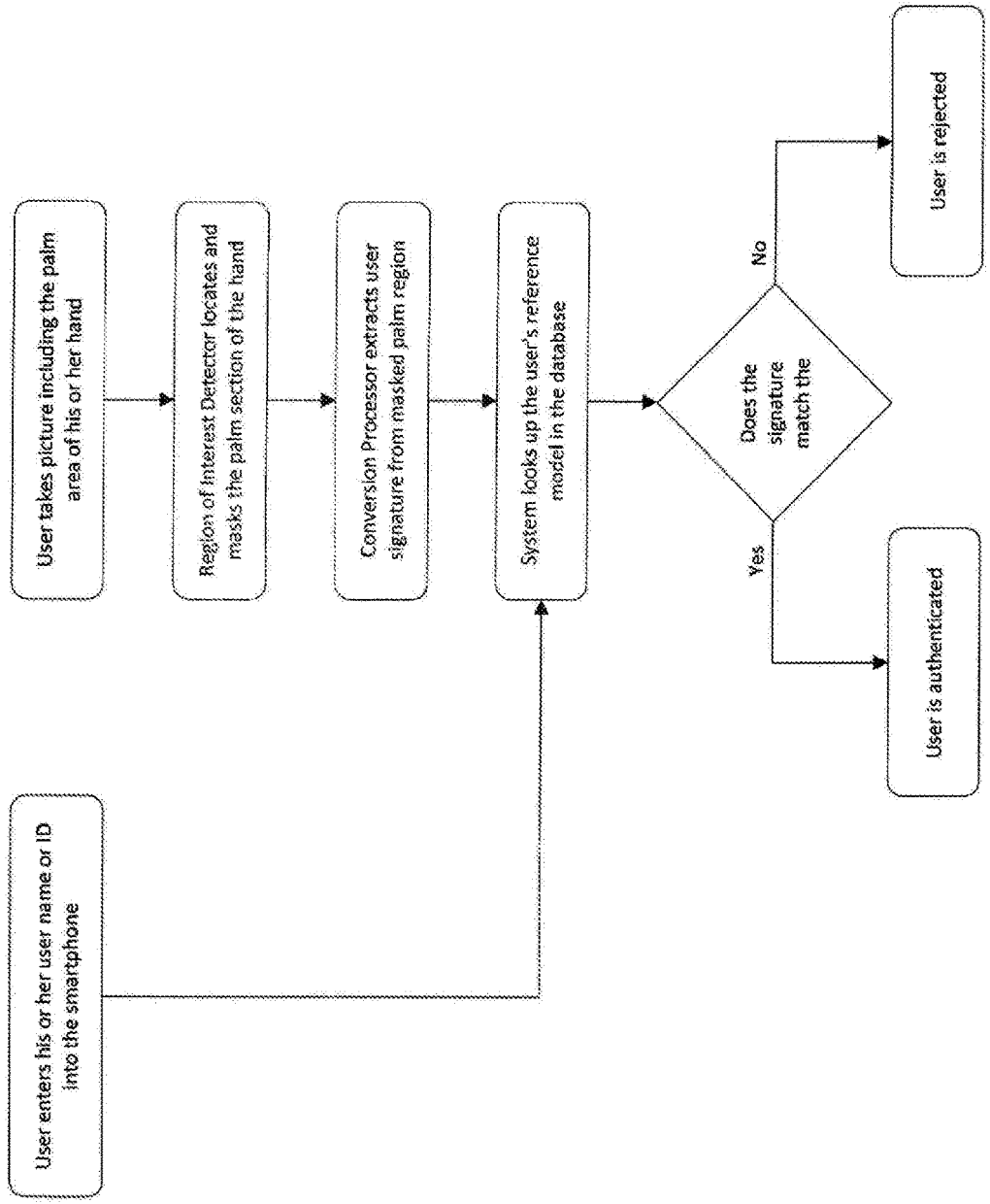
FIG. 4 is a flowchart illustrating the key steps in authenticating a user or device according to the present invention in a preferred embodiment thereof.

The flowchart for user authentication according to the teachings of the present invention, in a preferred embodiment, is shown in FIG. 4. As a first step, the user at Device 100 may enter his or her name or other identifying information into Device 100, or the user's identity may already be pre-loaded in Device 100. Separately, the user takes a picture or set of pictures of the palm of his or her hand or hands using Camera 105 of Device 100. Next, Camera Data Processor 110 sends the raw pixel data to Region of Interest Detector 115 which determines the palm area within the image. The masked palm area from Region of Interest Detector 115 is fed to Conversion Processor 120, which derives the unique signature of the user. This conversion function can alternatively be processed on a remote resource or partially on a remote resource and partially on Device 100. With no direct contact between the imaged palm area and Device 100, using high-resolution images of the hand, taken free-form and in any orientation by the end user without any special hardware beyond a common digital camera, the system of the present invention identifies the individual using a multi-step software solution involving feature extraction, feature processing into user signatures, and the matching of user signatures to stored user signatures or user models in which: (i) a single or multiple regions of interest are detected and segmented out from the input image to remove extraneous pixel data and isolate the palm area; (ii) a number of high dimensional sparse feature vectors are extracted from the image (see, for example, reference 8); (iii) a single signature for each image is created in a process in which nearby feature vectors are pooled into a more compact and robust image representation; and (iv) multiple image signatures are combined into an identity model for each individual user.

Authentication and Identification Engine 130 then looks up the user's model (based on the user identifying data previously presented) in the Database of User Models 135. At this point, if the derived user signature matches the stored user model, then the user is authenticated and is permitted access to the desired resource or set of resources. Alternatively, if the user signature and model do not match, then the user is denied access to the desired resource or set of resources. The foregoing functionality regarding look up and matching may alternatively be performed remotely to Device 100.

In case of identification, the user presents only a palm print image or set of images, and Authentication and Identification Engine 130 compares the signature derived from the palm print image or images with all models or a subset of models in the Database of User Models 135. If a match is found then the user is identified. If no match is found, the user is unknown.

Figure 5:
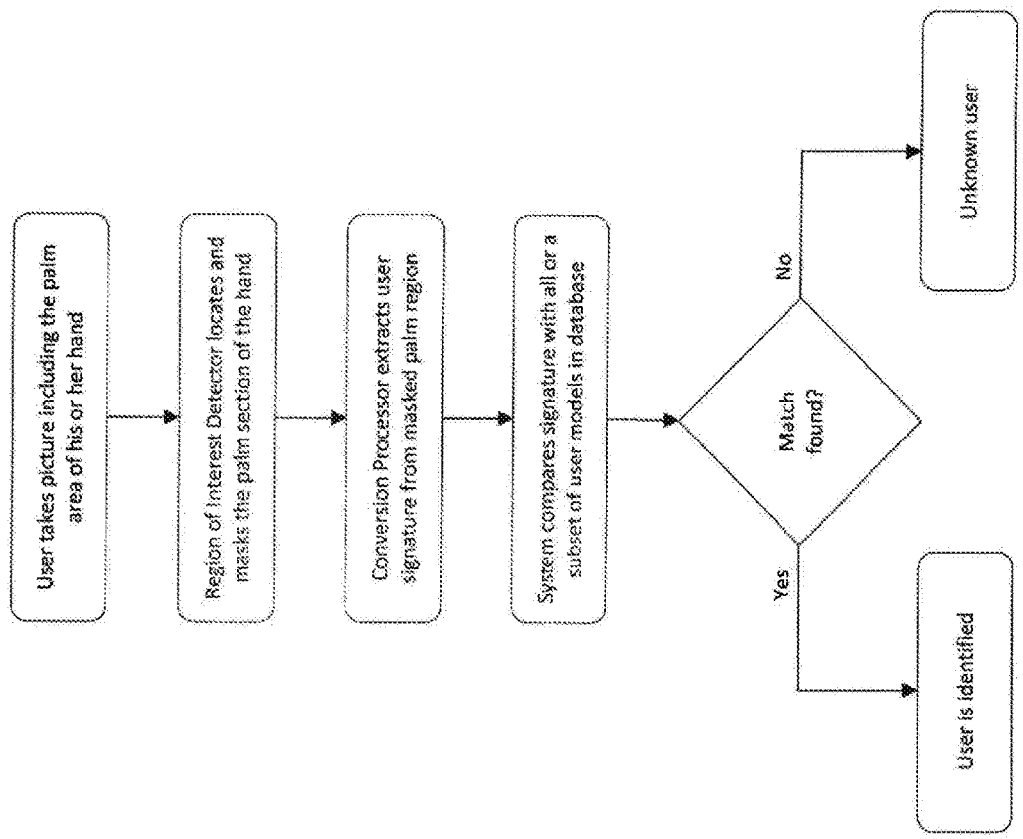
FIG. 5 is a flowchart illustrating the key steps in identifying a user or device according to the present invention in a preferred embodiment thereof.

The flowchart for user identification is shown in FIG. 5. In this case, as in the case of authentication, the user takes a picture or set of pictures of the palm of his or her hand. This data is again processed into pixel form by Camera Data Processor 110 and sent to Region of Interest Detector 115 to determine the palm area within the image. The masked palm area from Region of Interest Detector 115 is fed to Conversion Processor 120, which derives the unique signature of the user and then AID Engine 130 compares the derived signature with all models or a subset of models stored in the Database of User Models 135. The above referenced conversion and comparison functions could alternatively be processed on a remote resource or partially on a remote resource and partially on Device 100. In any event, if a match is found, then the user is identified and may be granted access to a resource or set of resources. If no match is found, then the user can not be identified and access to a desired resource or set of resources will not be granted.

Which mode (authentication or identification) is used depends on the application. In general, authentication provides a higher degree of accuracy but a lower user experience level because of the extra step a user needs to take to enter an additional factor of his or her identity. The second factor of identity can take any of the common forms, such as a user name, user ID, password, unique employee ID, social security number, email address, a variety of other biometric modalities, among others. In one embodiment of the present invention, the second factor of identity is the signature derived from the palm print image(s) of the individual's second hand, with the individual signatures of each of both palm print images or sets of images of the individual utilized together for authentication or identification.

It is important to note that in each case described above (authentication or identification), instead of matching a user signature against a model within Database of User Models 135 located locally within Device 100, a signature generated by an image or set of images of a user's palm taken at Device 100 could be matched against a model or models contained in a database located at either or both of Remote Server 200 or one or more Remote Devices 300. In this case, the user of Device 100 would typically be seeking access to one or more resources resident at these remote platforms rather than a resource located locally within Device 100. By way of example, in the case of unlocking, for example, a smartphone, processing could be done locally at the smartphone/Device 100 whereas if authentication is being undertaken, for example, in connection with a remote based application, some portion of the processing could be done at a Remote Server 200 with user models to be matched against being stored possibly at Remote Server 200 as opposed to locally on the smartphone. Additionally, it should be apparent from the present teachings that user models, signatures and/or other biometric data can be synchronized between any of the AID Units 160, 205, 305 to allow for local authentication or identification at any one of Device 100, Remote Server 200, Remote Device 300 without said Device 100, Remote Server 200 or Remote Device 300 having generated that user model, signature and/or other biometric data locally.

Returning now to FIG. 2, it can be seen that in a preferred embodiment of the present invention, at step (1), Device 100 is used to take a picture or series of pictures of the palm of the user to be identified (step (2)) with Camera 105 (step (3)). A flash component (step (4)) may be embedded in Device 100 to provide necessary pre-processing of the image, particularly as it relates to providing minimum sufficient light for region of interest detection, feature extraction, and signature processing of the individual's palm image. Next, the palm region of the image is masked by Region of Interest Detector 115 (step (5)) and fed to Conversion Processor 120 (step (6)) to convert raw pixels into a uniquely identifying user signature, Signature 125. The user signature is a compact code that contains relevant identifying information associated with the user's palm print image and can be quickly and precisely matched to a large database of user models such as Database of User Models 135 or a database at a remote platform (step (7)). One benefit of the derived user signature is that it makes it essentially impossible to reconstruct a user's palm image from a database of user models. In step (8), AID Engine 130 compares the user signature from the palm image or set of images with those in the database of user models to identify or authenticate the user as applicable. The above referenced conversion and comparison functions could alternatively be processed on a remote resource or partially on a remote resource and partially on Device 100.

Figure 3:
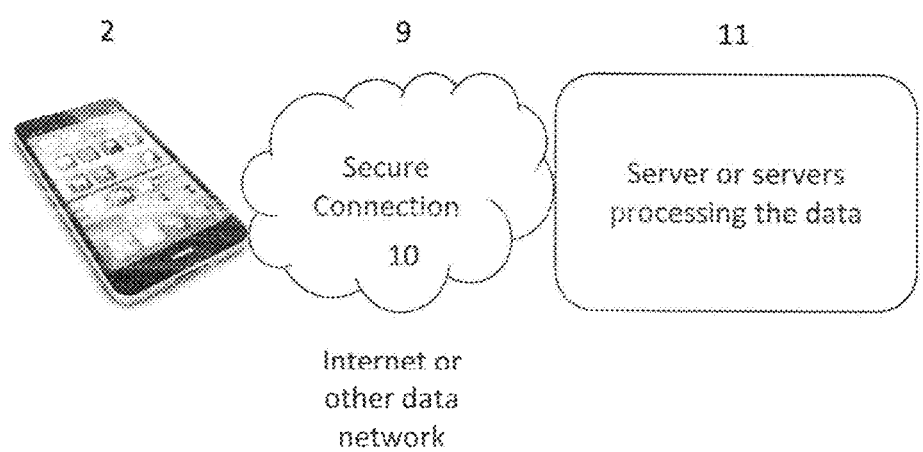
FIG. 3 is a diagram illustrating the secure connectivity between a mobile device and one or more remote servers according to a preferred embodiment of the present invention.

Turning now to FIG. 3, it can be seen that in cases where authentication or identification is being accomplished with respect to a remote resource, communication between Device 100 and that remote resource preferably occurs over a secure connection as is known in the art. This can involve one or more techniques as is known in the art to include, for example, strong encryption, public or private key encryption, digital certificates, and/or digital signatures among others.

Now that the system and primary methodologies of the present invention have been described, additional novel features, such as various methodologies for preventing spoofing in connection with authentication/identification as well as a novel methodology for encoding and exchanging transaction information with remote resources will be discussed.

Spoof protection is an important aspect of this invention. It prevents adversaries, for example, from using a printed photograph of a palm instead of a real hand for authentication. One novel aspect of the present invention that is directed to spoof protection involves detecting and using the three dimensional characteristics of a human hand in order to provide security against spoofing.

In one example of spoof detection, in order to distinguish between a photograph and a real hand, the system of the present invention takes a series of pictures in rapid sequence, with the camera flash being used intermittently and at varying lengths of time. The pictures of a 3-D object (a real hand) taken with the flash will have certain highlighted regions and shadows created by the flash, whereas on positions of the hand in which a 2-D representation of the hand (for example, a printed photograph of a palm or a palm image shown on the display screen of another mobile device) would not show such highlighted regions and shadows. This allows the system of the present invention to utilize a comparison of the highlighted regions and shadows on the hand created between the flash and non-flash photos to distinguish between a printed photograph and a real hand. In this way, an unauthorized party who happens to have obtained a picture of an authorized user's palm cannot use that picture to gain unauthorized access to local or remote resources.

Further methods for detecting a real hand include 3-D modeling of the hand. In this case, the system of the present invention may prompt the user to turn his or her hand while a series of multiple pictures are taken. A true 3-D object will reveal different parts of the hand with each successive image while a 2-D object will always show the exact same part of the hand, just with varying degrees of distortion. This lets the system of the present invention distinguish between a printed photograph and a real hand. Similarly, instead of rotating the hand, the user can be prompted to close the hand to a fist or open it from a fist while the series of pictures is taken. Other methods of distinguishing a real hand from the photograph of a hand are also possible.

Another novel aspect of the present invention is a methodology in which replay attacks may be detected and prevented. In this case, an adversary modifies a mobile device such that it sends one or a series of previously recorded pictures from the real hand of a legitimate user to the network for authentication or identification instead of sending the images taken by the camera. It is assumed here that the adversary could take pictures of an authorized user's hand without the authorized user being aware or able to prevent this. If this is in fact a risk (e.g., a case where an authorized user is sleeping or unconscious), then it is preferable for the system to be used in such a way that one or more additional identity factors such as a user ID or other form of data independent of the palm print image is required to authenticate a user.

To detect and defend against a replay attack, the system of the present invention issues a series of pictures and flashes at a variety of intervals, i.e., it records a series of pictures, some with the flash turned off and others with the flash turned on. The specific pictures and flash on/off sequence can be chosen at random or according to a pre-determined sequence and can change for each authentication or identification request. The system of the present invention can easily detect if an adversary uses a previously recorded series of pictures because the on/off pattern of the pictures and flashes will not match the one actually sent to the mobile device.

Another method to detect a replay attack involves storing all previously used images and comparing new images against that database. Because the pixel data underlying the images of two different palms can essentially never be exactly the same or substantially the same to a certain tolerance level, the system can detect when a previously taken image is used again. Other methods of detecting a replay attack are also conceivable.

Yet another novel aspect of the present invention is the ability to embed transaction information or other data within the timing of a series of photographs and/or flash patterns. This timing pattern can further be used to encode information about the transaction itself. A cryptographic hash code can then be applied to this information. The hash code makes the resulting code compact (short) and also prevents anybody who observes the flash pattern from deriving any information about the original content of the code. In one embodiment of the present invention, the timing of the sequence of images and/or flash patterns is utilized as part of an anti-spoofing mechanism to determine whether the image sequence provided for authentication or identification matches the information from the transaction itself. A specific implementation may include:

1. A low resolution video of the palm area with the flashing pattern.
2. One or several high resolution still images of the palm area.
3. Computer vision technology to ensure the high resolution image(s) are from the same object as the ones in the video.

Based on the above description of the system and methodologies of the present invention, it can be understood that various applications are possible. Examples include, without limitation, access to one or more devices, access to one or more applications resident on those devices or located remotely on a server or on other remote devices, a variety of transactional applications (such as electoral voting, distribution of state welfare, financial payments), and any other type of transaction requiring validation of user identity.

In summary, in exemplary embodiments, the present invention provides computer systems (including a combination of software running on suitable hardware), computer-implemented methods, and devices for authentication or identification of an individual which includes using an image or a set of images of an individual's palm through a process involving the following steps: (1) detecting the palm area using local classifiers; (2) extracting features from the region(s) of interest; and (3) computing the matching score against user models stored in a database, which can be augmented dynamically through a learning process. Thus, the invention includes a system for providing selective access to resources available in connection with a device comprising software executed on suitable computer hardware, in which the system comprises: (a) at least one camera associated with said device, said camera being capable of taking at least one photograph of a human palm print: (b) a detector module using local classifiers to locate and segment the region of interest of the palm without physical contact; (c) a conversion processor which converts raw pixel data associated with said region of interest of a human palm print into a unique signature associated with said palm print; and (d) an authentication and identification engine, said authentication and identification engine determining whether access to one or more of said resources should be granted based upon said unique signature and at least one database containing a plurality of user models. The system may further comprise a learning processor that improves the user models with new data, wherein the learning processor selectively includes said palm print image to augment said database and said authentication and identification engine. In embodiments, the device is a mobile device, while in other embodiments, the device is a desktop device or a stationary embedded device. The system can include a flash component that selectively activates at the time of image capture to provide minimum sufficient light for region of interest detection, feature extraction, and signature processing of the human's palm image. In embodiments, the conversion processor of the system uses descriptors extracted from patches over the region of interest. The descriptors can be encoded into high dimensional sparse vectors, which can be pooled into at least one group.

The system of the invention can have, as part of the method implemented within the system, the feature of computing a signature from a Bag of Features or multiple Bags of Features representations. In addition, the detector module of the system can use Haar Wavelets and AdaBoost algorithms. In various embodiments, the system includes a detector module that uses support vector machines or a convolutional neural network. The user module of the system can be a statistical model computed from a collection of a human's palm images. Likewise, the user model can be a Gaussian density model or a mixture of Gaussians density model.

The system of the invention can be configured such that at least one of the resources is remote from the device. Alternatively, at least one of the resources can be resident on the device. In some embodiments, at least one of the resources is an application or a database.

In embodiments of the system of the invention, the individual signatures of each of both palm print images of a human, if available, are utilized together for authentication or identification of the human.

In some embodiments of the system of the invention, palm print authentication or identification is combined with other modalities, such as one or more of the following: passcodes, security questions, fingerprint recognition, facial recognition, iris recognition, written signature recognition, and other biometric and non-biometric modalities.

The system of the invention can be implemented in a way such that an application selectively permits one or more users to conduct one or more transactions.

The system of the invention can also include the use of a sequence of flash and non-flash images of the human's palm, which can be used, among other things, as part of an anti-spoofing mechanism to determine whether the presented hand is a 3-D object or a 2-D representation of a hand. Furthermore, the system of the invention can be implemented in such a way that image data captured during movement of the human's palm are utilized as part of an anti-spoofing mechanism to determine whether the presented hand is a 3-D object or a 2-D representation of a hand. In some embodiments, the sequence of flash and non-flash images of the human's palm as well as the time interval(s) between successive images are utilized as part of an anti-spoofing mechanism to determine whether an adversary is attempting to utilize a previously-recorded sequence of images for authentication or identification.

In some embodiments of the invention, all of a human's previously used images are stored, such as in a database resident on a computing device, for comparison against new images as part of an anti-spoofing mechanism to determine whether an adversary is attempting to utilize previously-recorded images for authentication or identification. And yet further, in certain embodiments, the system of the invention is implemented such that transaction information or other data is embedded within the timing of a sequence of images and/or flash patterns as part of an anti-spoofing mechanism to determine whether the image sequence provided for authentication or identification matches the information from the transaction itself.

While particular embodiments of the present invention have been shown and described, it will be obvious to those skilled in the art that, based upon the teachings herein, changes and modifications may be made without departing from this invention and its broader aspects.

REFERENCES CITED (1) Paul Viola and Michael Jones, Rapid Object Detection using a Boosted Cascade of Simple Features, Proceedings of IEEE Computer Vision and Pattern Recognition, 2001, pages 1:511-518.
(2) Corinna Cortes and Vladimir N. Vapnik, Support-Vector Networks, Machine Learning, 20, 1995.
(3) Yann LeCun, Léon Bottou, Yoshua Bengio, Patrick Haffner: Gradient-Based Learning Applied to Document Recognition, Proceedings of the IEEE, 86(11):2278-2324, November 1998.
(4) Pierre Sermanet, Koray Kavukcuoglu, Soumith Chintala and Yann LeCun: Pedestrian Detection with Unsupervised Multi-Stage Feature Learning, Proc. International Conference on Computer Vision and Pattern Recognition (CVPR'13), IEEE, June 2013.
(5) David G. Lowe, "Distinctive image features from scale-invariant keypoints," *International Journal of Computer Vision*, 60, 2 (2004), pp. 91-110.
(6) N. Dalal and B. Triggs. Histograms of oriented gradients for human detection. In Proceedings of Computer Vision and Pattern Recognition, 2005.
(7) Y-Lan Boureau, Jean Ponce and Yann LeCun: A theoretical analysis of feature pooling in vision algorithms, Proc. International Conference on Machine learning (ICML'10), 2010.
(8) Yann LeCun, Koray Kavukvuoglu and Clément Farabet: Convolutional Networks and Applications in Vision, Proc. International Symposium on Circuits and Systems (ISCAS'10), IEEE, 2010.

The invention claimed is:

1. An anti-spoofing system for providing selective access to resources available in connection with a smartphone based on a deep learning method, the system comprising:
(a) the smartphone comprising a digital processor, a memory module, an operating system, and non-transitory storage media comprising instructions executable by the digital processor;
(b) at least one camera associated with the smartphone and configured to capture a plurality of images comprising a flash image and a non-flash image of a human anatomical feature of a first user, wherein the plurality of images are captured without the human anatomical feature physically contacting the smartphone; and
(c) at least one flash component associated with the smartphone and configured to emit a flash during the capture of the flash image and to not emit a flash during the capture of the non-flash image;
wherein the digital processor performs the following:

(1) using sliding-window-based local classifiers and classifiers formed by discriminative local features learned from a collection of exemplar images to analyze the flash image and the non-flash image of the human anatomical feature to label anatomical and non-anatomical pixels by classification scores;
(2) using a trained detector to locate and segment a region of interest of the human anatomical feature within the flash image and the non-flash image;
(3) using small sampling windows within the region of interest to identify image patches encompassing characteristic biometric features of the human anatomical feature;
(4) extracting a signature from pixel-level data of the image patches, wherein the signature is unique to the first user and is used to distinguish the first user from a second user, and wherein extracting the signature comprises creating a histogram of edge orientations in a plurality of the image patches;
(5) determining a spoofing attempt based on a three dimensional characteristic of the human anatomical feature and a plurality of stored user models, wherein the three dimensional characteristic is based on a comparison between the flash image and the non-flash image, wherein the comparison between the flash image and the non-flash image comprises determining a highlighted region and a shadow region in at least one of the flash image and the non-flash image, to determine whether at least one of the flash image and the non-flash image represents a 3-D object or a 2-D representation of a human anatomical feature;
(6) denying access to one or more of the resources to the first user, based upon the determination of the spoofing attempt; and
(7) storing the at least one of the plurality of images of the human anatomical feature and the three dimensional characteristic in the collection of exemplar images.

2. The system of claim 1, wherein the digital processor further performs improving the plurality of user models with new data by selectively including the at least one image of the human anatomical feature, the pixel-level data of the image patches, and the signature to augment the at least one database and the determination of the spoofing attempt.

3. The system of claim 1, wherein the digital processor further performs using descriptors extracted from the image patches over the region of interest.

4. The system of claim 3, wherein the descriptors are encoded into high dimensional sparse vectors and wherein the sparse vectors are pooled into at least one group.

5. The system of claim 1, wherein the signature is computed from a Bag of Features or multiple Bags of Features representations.

6. The system of claim 1, wherein the analyzing the flash image and the non-flash image of the human anatomical feature uses Haar Wavelets and AdaBoost algorithms.

7. The system of claim 1, wherein the analyzing the flash image and the non-flash image of the human anatomical feature uses support vector machines, a convolutional neural network, or both.

8. The system of claim 1, wherein the user models comprise a statistical model computed from a collection of the first user's human anatomical feature images.

9. The system of claim 1, wherein the user models comprise a Gaussian density model or a mixture of Gaussian density models.

10. The system of claim 1, wherein at least one of the resources is remote from the smartphone or resident on the smartphone.

11. The system of claim 10, wherein the at least one of the resources comprises an application or a database.

12. The system of claim 1, wherein individual signatures of both anatomical feature images of the first user are utilized together for the determination of the spoofing attempt.

13. The system of claim 1, wherein the denying access to one or more of the resources is further based on one or more other modalities.

14. The system of claim 13, wherein the one or more other modalities comprise one or more of: passcodes, security questions, fingerprint recognition, facial recognition, iris recognition, written signature recognition, and other biometric and non-biometric modalities.

15. The system of claim 1, wherein the denying access to one or more of the resources is further based on selectively denying one or more users from conducting one or more transactions.

16. The system of claim 15, wherein a transaction information or other data is embedded within one or more time intervals between subsequent images, and wherein the determination of the spoofing attempt is further based on a comparison between the transaction information and the transaction.

17. The system of claim 1, wherein at least two of the plurality of images are captured during a movement of the human anatomical feature, and wherein the three dimensional characteristic is further based on the movement.

18. The system of claim 1, wherein the plurality of images comprises a sequence of flash images and non-flash images, and wherein the determination of the spoofing attempt is further based on a comparison between the sequence of flash and non-flash images and a previously-recorded sequence of flash and non-flash images.

19. The system of claim 1, wherein the determination of the spoofing attempt is further based on a comparison between at least one of the plurality of images and at least one image of the first user anatomical feature in the collection of exemplar images.

20. The system of claim 1, wherein the capture of at least one of the plurality of images is separated from the capture of a subsequent image by a time interval, and wherein the determination of the spoofing attempt is further based on a comparison between the time interval and a previous time interval between previously-recorded consecutive images.

21. An anti-spoofing method implemented by a smartphone for providing selective access to resources available in connection with a smartphone based on a deep learning method, the method comprising:

(a) using at least one camera associated with the smartphone and configured to capture a plurality of images comprising a flash image and a non-flash image of a human anatomical feature of a first user, wherein the plurality of images are captured without the human anatomical feature physically contacting the smartphone;

(b) using at least one flash associated with the smartphone and configured to emit a light during the capture of the flash image;

(c) using sliding-window-based local classifiers and classifiers formed by discriminative local features learned from a collection of exemplar images to analyze the flash image and the non-flash image of the human anatomical feature to label anatomical and non-anatomical pixels by classification scores;

(d) using a trained detector to locate and segment a region of interest of the human anatomical feature within the flash image and the non-flash image;

(e) using small sampling windows within the region of interest to identify image patches encompassing characteristic biometric features of the human anatomical feature;

(f) extracting a signature from pixel-level data of the image patches, wherein the signature is unique to the first user and is used to distinguish the first user from a second user, and wherein extracting the signature comprises creating a histogram of edge orientations in a plurality of image patches;

(g) determining a spoofing attempt based on a three dimensional characteristic of the human anatomical feature and a plurality of stored user models, wherein the three dimensional characteristic is based on a comparison between the flash image and the non-flash image, wherein the comparison between the flash image and the non-flash image comprises determining a highlighted region and a shadow region in at least one of the flash image and the non-flash image, to determine whether at least one of the flash image and the non-flash image represents a 3-D object or a 2-D representation of a human anatomical feature;

(h) denying access of one or more of the resources to the first user based upon the determination of the spoofing attempt; and (i) storing the at least one image of the human anatomical feature in the collection of exemplar images.

\* \* \* \* \*